June 27, 1933.   G. MEMINI   1,916,060
AIRCRAFT CARBURETOR
Filed April 4, 1931   2 Sheets-Sheet 1
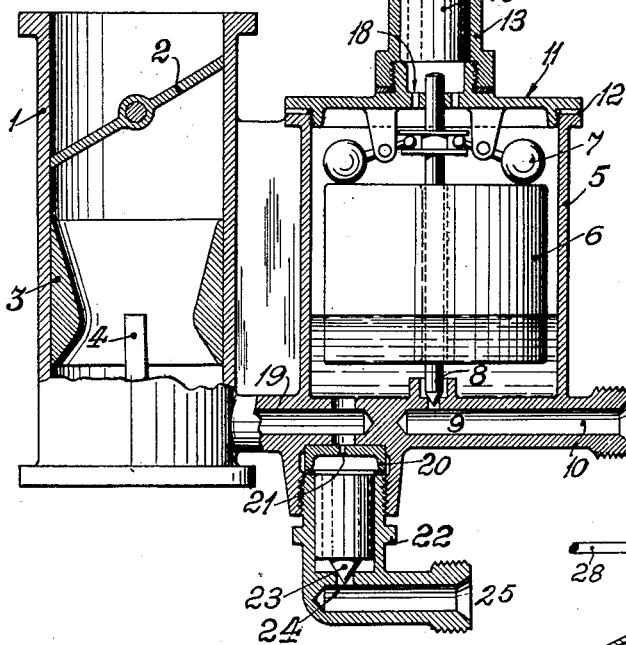
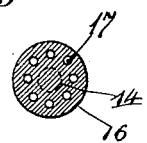
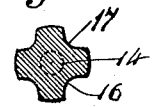
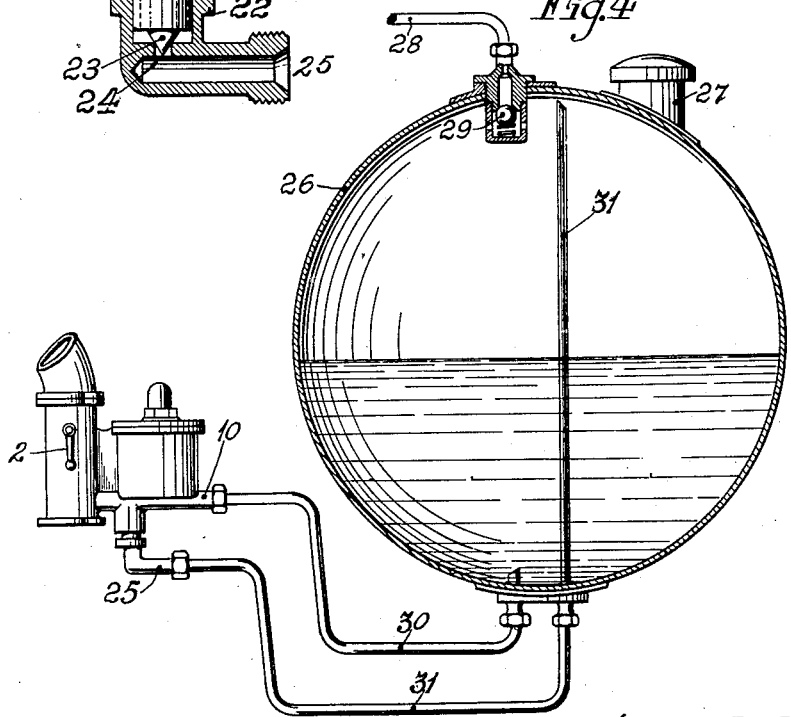
INVENTOR
Giacomo Memini
BY Morrison, Kennedy & Campbell
ATTORNEYS.

June 27, 1933.   G. MEMINI   1,916,060
AIRCRAFT CARBURETOR
Filed April 4, 1931   2 Sheets-Sheet 2
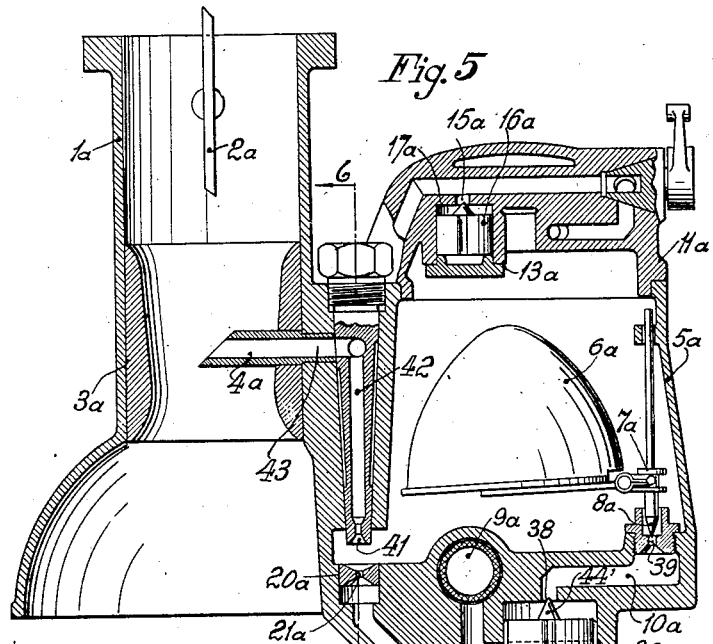
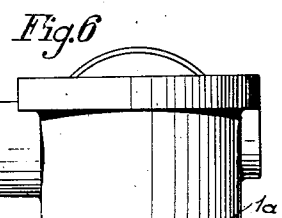
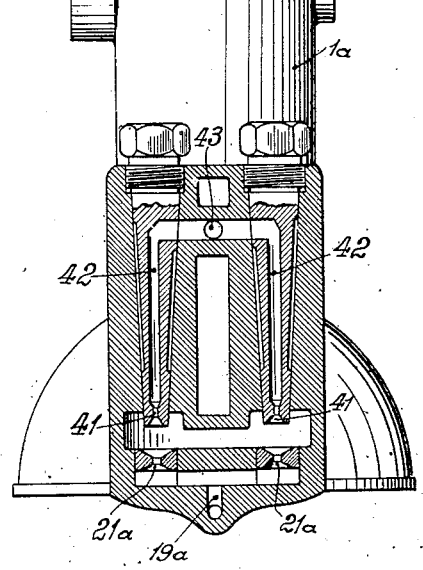
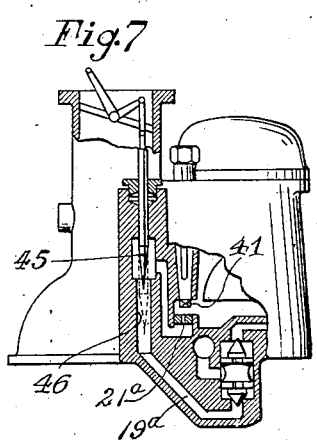
INVENTOR.
Giacomo Memini
ATTORNEYS.

Patented June 27, 1933

1,916,060

UNITED STATES PATENT OFFICE

GIACOMO MEMINI, OF MILAN, ITALY

AIRCRAFT CARBURETOR

Application filed April 4, 1931, Serial No. 527,838, and in Italy April 14, 1930.

The present invention is a novel aircraft-carburetor and concerns a device adapted to allow carburetors of aircraft motors to function either in an upside-down position or right-side up position of the aircraft.

Usually upside-down flight is accomplished by shutting off the normal fuel inlet to the carburetor and opening another which connects to a supplementary fuel tank; this is done by the pilot working a valve by hand.

The invention solves the problem of rendering automatic such working and comprises essentially at least one closing member which, by gravity—that is, by the effect of its own weight or by the action of the weight of another member, transmitted to it by a suitable kinemetical train—shuts off, during normal flight, the inlet of fuel from a supplementary passage or pipe whereas, during upside-down flight it opens the aforesaid inlet so that the fuel can flow to the atomizing contrivance.

The characteristic commutator device according to the invention can naturally, in practice either be intimately connected with the carburetor proper in one sole construction specially made, or else it can be applied, with proper precautions, to a carburetor of any type.

In a first method of carrying out the invention, two conduits or pipes leading from the tank to the carburetor are provided. That is, one for normal flight and the other for upside-down flight, the shutting off device closing the normal pipe only during upside-down flight.

In a second and more advantageous method of working the same shutting device acts, in the one position, to close one pipe and open the other, whereas, in the other position it closes the latter and opens the former.

The shutting-off members is advantageously placed in a chamber into the central zone of which opens the fuel feed pipe from the tank, whilst the two extremities of the chamber connect with channels leading respectively to the constant-level vessel and to the conduit which feeds the atomizing device during upside-down flight, the shutting-off member being provided with elements adapted to close either the one or the other of these two connections.

A further feature consists in eventually combining the feed pipe for upside-down flight with mechanical means, controlled by hand or automatically, intended to control the cross section of the passage within the pipe itself and therefore the volume of the stream thus also, during upside-down flight, regulating the proportion of fuel in the carburetor mixture. Such means which admit of variation and which may advantageously carry a pin or spike adapted to enter more or less into the pipe may also provide for an admission of air intended to dilute the stream and influence favourably the feed of the atomizer during upside-down flight.

A further feature consists in providing the pipe leading fuel from the level-vessel and feeding it into the atomizer with openings (having calibrated contractions), which openings are aligned with the ends, also calibrated, of the feed pipes for upside-down flight. By such a provision, the flooding of the chamber of the level-vessel during upside-down flight is avoided.

The invention will now be described in relation to the attached drawings which show, by way of example only, two ways of carrying out the invention, both being of the type of construction in one piece with the carburetor.

In the drawings:

Fig. 1 is a longitudinal section of a carburetor provided with the commutator device in one form.

Figs. 2 and 3 are cross sections of two different types of shutting off members acting by their own weight.

Fig. 4 is a diagrammatic general view of the feed apparatus of the carburetor shown in Fig. 1, the feed device being of the pressure type.

Fig. 5 is a longitudinal section of a carburetor of another form.

Fig. 6 is a cross section of Fig. 5 along line 6—6.

Fig. 7 shows one form of embodiment of the regulating device of the complementary channel.

In the main body 1 of the carburetor, there are placed as usual, the butterfly valve 2, the diffuser 3 and the jet or atomizer 4.

The mechanism which ensures the automaticity of the proportioning the mixture to the varying duties of the motor, may naturally, be of any known type.

To the side of the body 1 of the carburetor, is joined an ordinary vessel 5 containing suitable mechanism adapted to maintain the petrol at a constant level; in the drawings, by way of example, there is indicated a counterpoise type in which we have: 6 the float, 7 the counterweights acting on the pin 8 obstructing the opening 9 of the main fuel feed pipe 10.

The cover 11 is fixed to the vessel 5 and is hermetically sealed by the packing 12. Above the cover is screwed, also with a tight joint, the dome 13 which acts as guide to a valve 14 with a pin acting in the opening 15 of the dome 13. This valve has an extension 16 which renders it heavy and which carries longitudinal ports or slots 17 (see Figs. 2 and 3) which permit the feed passage of the petrol along the body of the valve. Holes 18 put the inside of the vessel into communication with the atmosphere.

The communication between the bottom of the constant-level vessel and the carburetor proper, or, more precisely, between the vessel and the device for automatic feed which ends at the jet 4, is usually by a simple conductor 19.

Below the conduit or passage 19 there is a disc 20, having a calibrated port 21 which opens into the conduit itself, the disc being held in place by a stopper or nipple 22 screwed in with a tight joint and forming a seat for valve 23 similar to 14, but inverted and acting in the opposite sense to that one, on the port 24 which is in communication with the supplementary fuel supply conduit 25. Normally the valve 23 shuts the port 24 by its own weight.

The fuel tank 26, which can be without pressure, is in the example illustrated, under pressure. 27 is the charging opening with a tight joint. Pressure is transmitted through a tube 28 and is controlled by an automatic valve 29 which prevents the petrol from flowing into the tube when the tank is turned over.

Two feed pipes, 30 and 31 respectively, lead from the aforesaid tank, the first from below and the second from above. Tube 30 goes to the principal conductor 10 of the carburetor whereas 31 leads to the supplementary conductor 25.

In normal flight the carburetor functions as though the device above described did not exist. In fact the petrol arrives normally through the conductor 10 under the control of the constant level mechanism; the vessel is in communication with the atmosphere through the ports 18, 17, and 15. In this phase the supplementary conductor 25 remains shut at 24.

When the aeroplane turns over, the petrol or other fuel contained in the tank runs to the side occupied by the feed mouth and, in so doing, covers tube 31 while leaving uncovered tube 30. The petrol contained in the level-vessel runs to the cover end and fills dome 13.

The valve 14, by its own weight, shuts the small port 15 and prevents the petrol which may be in the vessel from issuing to the outside. At the same time, the pin 8, by the weight of the float and of the counterweights, shuts the small port 9 and thus prevents the flow of petrol into the vessel. The valve 23, by its own weight, opens port 24 of the supplementary conduit 25 allowing petrol to flow from conductor 31 to the calibrated port 21.

All this takes place by gravity and simultaneously. Consequently the carburetor does no longer function to give feed pressure due to the difference of the level, but applies the pressure which exists in the tank and causes the efflux of the petrol through the calibrated port 21.

When the aeroplane rights itself, everything returns automatically to normal conditions and the carburetor resumes its normal working.

Instead of a tank under pressure, the carburetor according to the invention may be combined with another means of causing the flow of petrol to overcome, during upside-down flight, the difference of level so as to reach the atomizer. For instance such means may include an injector, a pump or the like, not shown.

In the variation shown in Figs. 5 and 6, 1a is the body of the carburetor, 2a the butterfly valve, 3a the diffusor and 4a is the atomizer. 5a is the constant level-vessel and 6a is the float which acts on the pin 8 regulating the influx of fuel.

According to this modification, the channel 9a, which carries the fuel, as for instance petrol, from the tank, opens, by means of a conduit 35, into the central zone 36 of the space 37 in which is placed the shutting off member 23a or commutator for the deflection of the fuel. At the upper extremity of the space 37 is situated the opening 38 of the conduit 10a which leads the fuel into the constant level-vessel 5a through the calibrated port 39 controlled by pin 8a. At the lower extremity, however, the space 37 has the opening 40 into the channel 19a destined to convey the fuel to the atomizer 4a when flight is upside-down.

As shown in the diagram, that channel 19a ends in a space having two calibrated ports 21a in line with calibrated ports 41 opening into channels 42 which feed channel 43 connecting with the atomizer 4a or principal jet.

During normal flight the member 23a (see position indicated in the drawings) closes, by its conical lower valve 44, the aperture 40 of the channel 19a whilst the other small conical valve leaves free the opening 38 of canal 10a. Thus, the fuel which fills space 37, in which the shutting-off member is situated, flows along channel 10a and through the calibrated port 39 into the chamber of the level-vessel. The conduits 42 take the fuel to the atomizer 4a and thus we have normal working of the carburetor. In such a position the upper valve 16a leaves open the opening 15a in the communicating passage between the constant level-vessel and the atmosphere.

During upside-down flight (imagine the drawings to be inverted) the valve 16a closes port 15a. The shutting-off device 23a with its small conical valve 44' closes the opening 38 and opens the opening 40. In consequence the spirit flows along channel 19a and is aspirated into the carburetor proper through the calibrated and aligned ports 21a and 41. One must remember that, by the effect of this aspiration exercised through the ports 41 upon ports 21a duly calibrated, flooding the overturned level-vessel with fuel is avoided, instead of which, one may have a real state of low pressure.

As has been mentioned in the introduction to the present description, the section of channel 19a, destined to feed when flying upside-down, may be regulated as for example (Fig. 7) by means of a pin member 45 substantially conical which may be introduced to a greater or lesser extent in the channel itself so as to vary the size of the passage 46 for, and therefor the stream of, the fuel.

Consequently the inconvenience of having a very fat mixture during upside-down flight may be avoided. Such a pin, of obvious conception, may have a small channel destined to permit an entry of air therethrough and thus to have a preliminary dilution of spirit by means of such air. An opportune disposition of this channel for the introduction of air might also have a favourable influence on the flow of the combustible fluid from the ports 21a to ports 41 and thus also help to avoid the flooding already mentioned of the chamber of the level-vessel.

The improvement in one aspect may be described as an aircraft carburetor comprising in combination a main fuel passage, 10 or 10ª, for conducting fuel during normal flight from a fuel supply to the mixing or carburetion point, preferably via the float chamber, with a gravity operated valve of any kind, 8 or 8ª, or 44', adapted upon inversion of the aircraft to close the main passage, and a supplemental fuel passage 25 or 19ª conducting fuel from the supply to the mixing point during inverted flight, preferably otherwise than through the float chamber and with a gravity operated valve 23 or 44 normally closing the supplemental passage, but opening or rendering it operative upon inversion of the aircraft.

In practice, the commutator device might be provided as an apparatus in itself, applicable, through suitable connecting means, to the feed inlets to carburetors of any type.

In practice the particular form of embodiment may be subject to other variations without departing from the scope of the present invention.

Having now particularly described and ascertained the nature of my said invention and in what manner the same is to be performed I declare that what I claim is:

1. An aircraft carburetor operable both in normal flight and in inverted flight, comprising in combination with a constant level chamber, a main fuel passage for conducting fuel during normal flight from a supply to the constant level chamber and thence to the carburetion point, a gravity operated valve adapted upon inversion of the aircraft to close said main fuel passage, a supplemental fuel passage for conducting fuel during inverted flight from the supply to the carburetion point, without entering the control of the constant level chamber, and a second gravity operated valve normally closing said supplemental fuel passage but adapted upon inversion of the aircraft to open or render it operative.

2. A carburetor as in claim 1 and wherein the first gravity operated valve is actuated by a float member in the constant level chamber, while the second gravity valve is at a separate location and actuated by a separate weight.

3. An aircraft carburetor operable both in normal flight and in inverted flight, comprising a relay chamber receiving fuel from a supply for conduction to the carburetion point, a main fuel passage for conducting fuel during normal flight from the relay chamber to the carburetion point, a valve in said chamber adapted upon inversion of the aircraft to close the flow from the chamber to said main fuel passage, a supplemental fuel passage for conducting fuel during inverted flight from the relay chamber to the carburetion point, a second valve in said chamber normally closing the flow from said chamber to the supplemental fuel passage, and a weight movable vertically in said chamber and operating both of said valves to reverse their positions during inverted flight and vice versa, the supplemental passage being provided with a means or valve for adjusting the fuel flow rate through it to vary the proportions of the carbureted mixture during inverted flight.

4. An aircraft carburetor operable both in normal flight and in inverted flight, comprising a float chamber for maintaining constant fuel level during normal flight, a main fuel passage for conducting fuel during normal flight from a supply to the float chamber and thence to the carburetion point, a supplemental fuel passage for conducting fuel during inverted flight from the supply to the carburetion point, without traversing the float chamber, and a gravity operated valve normally closing said supplemental fuel pasage but adapted upon inversion of the aircraft to open or render it operative.

5. An aircraft carburetor operable both in normal flight and in inverted flight, comprising a main fuel passage for conducting fuel during normal flight from a supply to a float chamber, said float chamber, and beyond the float chamber a channel conducting the fuel to the carburetion point, a gravity operated valve adapted upon inversion of the aircraft to close said main fuel passage, and thus render inoperative the float chamber, a supplemental fuel passage for conducting fuel during inverted flight from the supply, said supplemental passage having a delivery port or nozzle directed to discharge towards and into the port or entrance of said channel leading to the carburetion point, and a gravity operated valve normally closing said supplemental fuel passage but adapted upon inversion of the aircraft to open or render it operative.

6. A carburetor as in claim 1 and wherein the supplemental passage is provided with a means or valve for adjusting the fuel flow rate through it to vary the proportions of the carbureted mixture during inverted flight.

7. A carburetor as in claim 4 and wherein the supplemental passage is provided with a means or valve for adjusting the fuel flow rate through it to vary the proportions of the carbureted mixture during inverted flight.

8. A carburetor as in claim 1 and wherein the supplemental passage is provided with a means or valve for adjusting the fuel flow rate through it to vary the proportions of the carbureted mixture during inverted flight, and means to admit air into the supplemental passage.

9. A carburetor as in claim 1 and wherein is means to admit small quantities of air to the supplemental passage.

In testimony whereof, this specification has been duly signed by

GIACOMO MEMINI.